Aug. 20, 1957 J. C. SETTLES 2,803,453
SPRING GROUP AND DAMPING MECHANISM ASSEMBLY
Filed Jan. 31, 1955 3 Sheets-Sheet 1
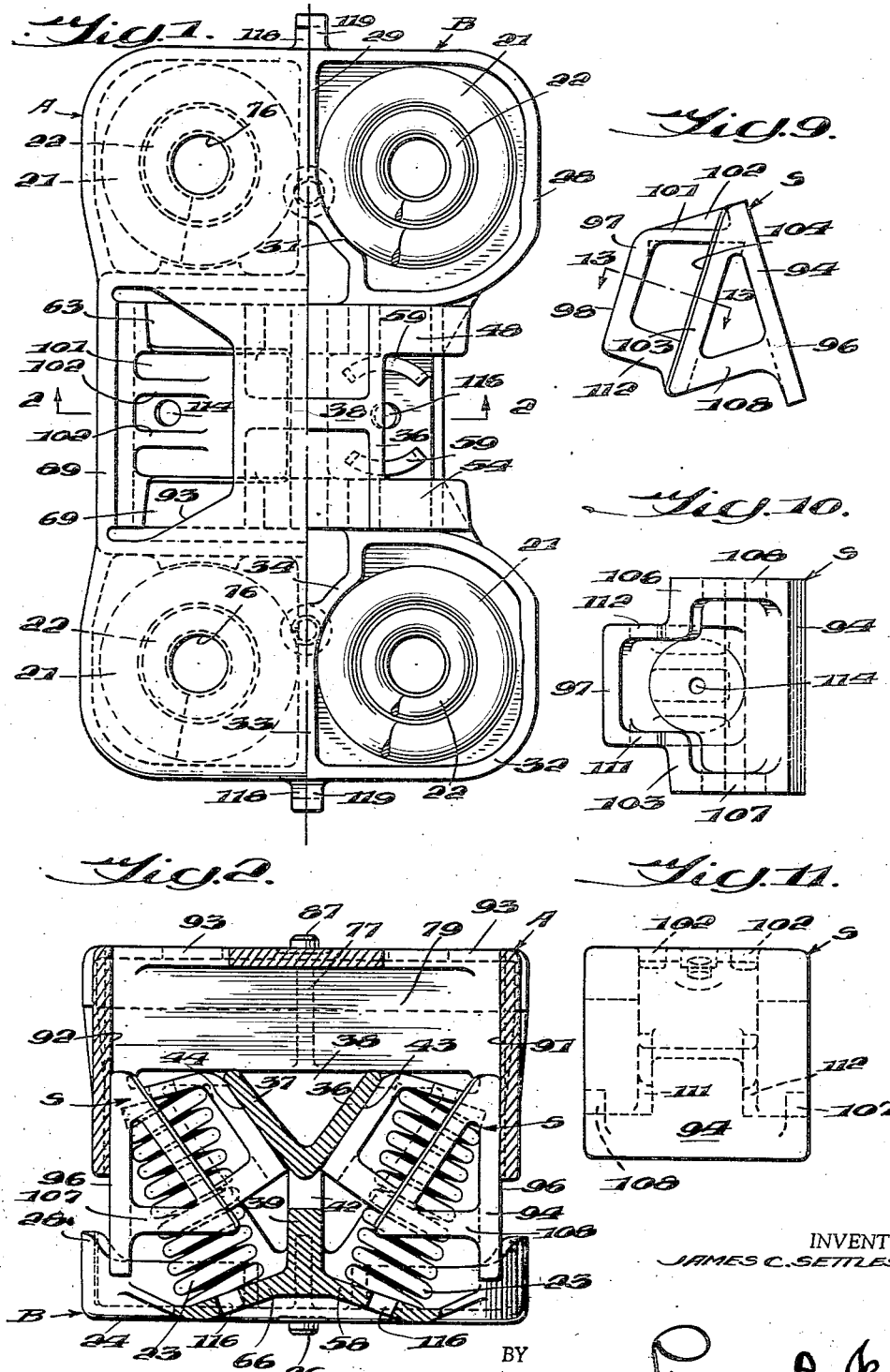
INVENTOR
JAMES C. SETTLES,
BY
ATTORNEY

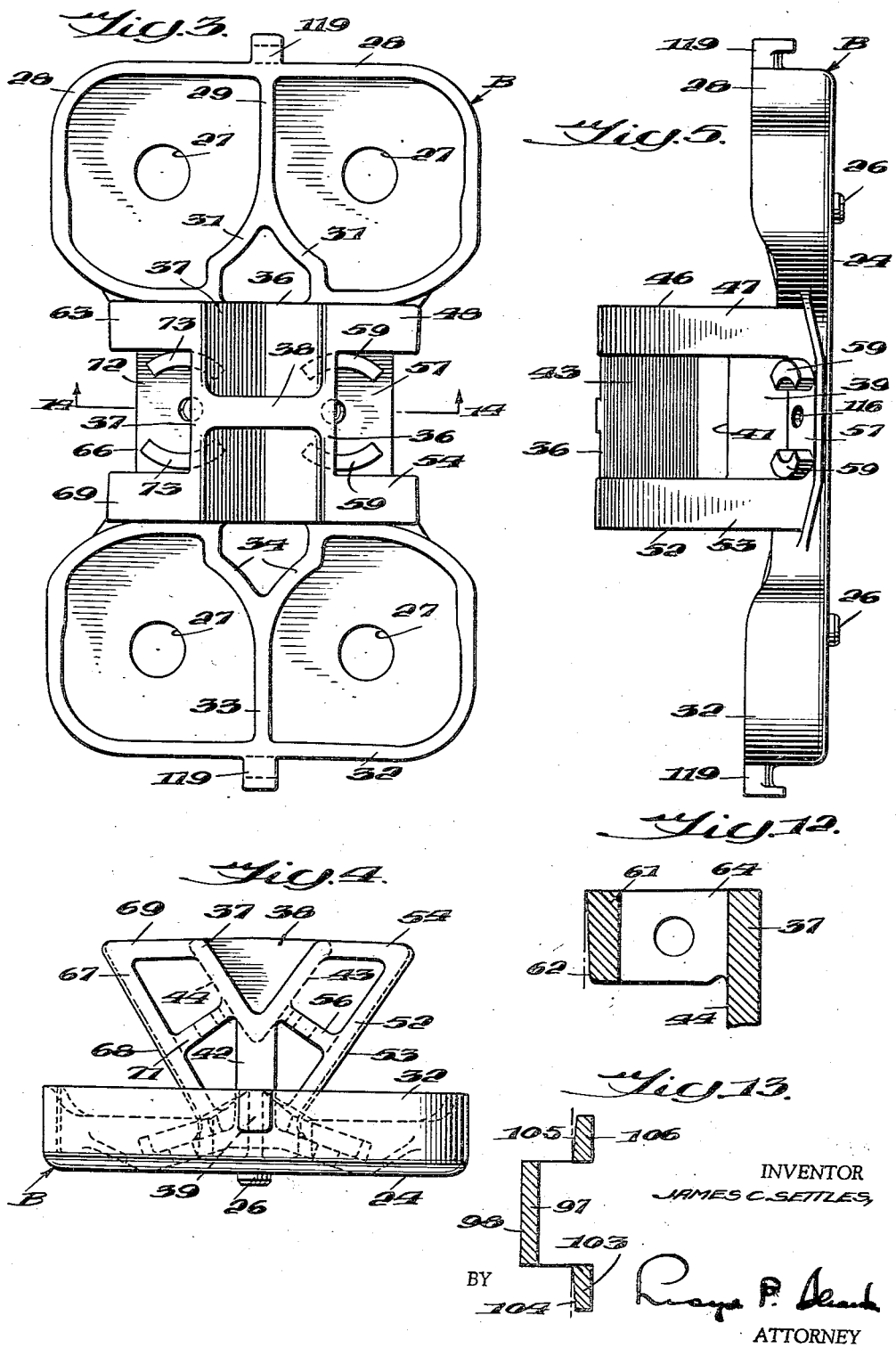

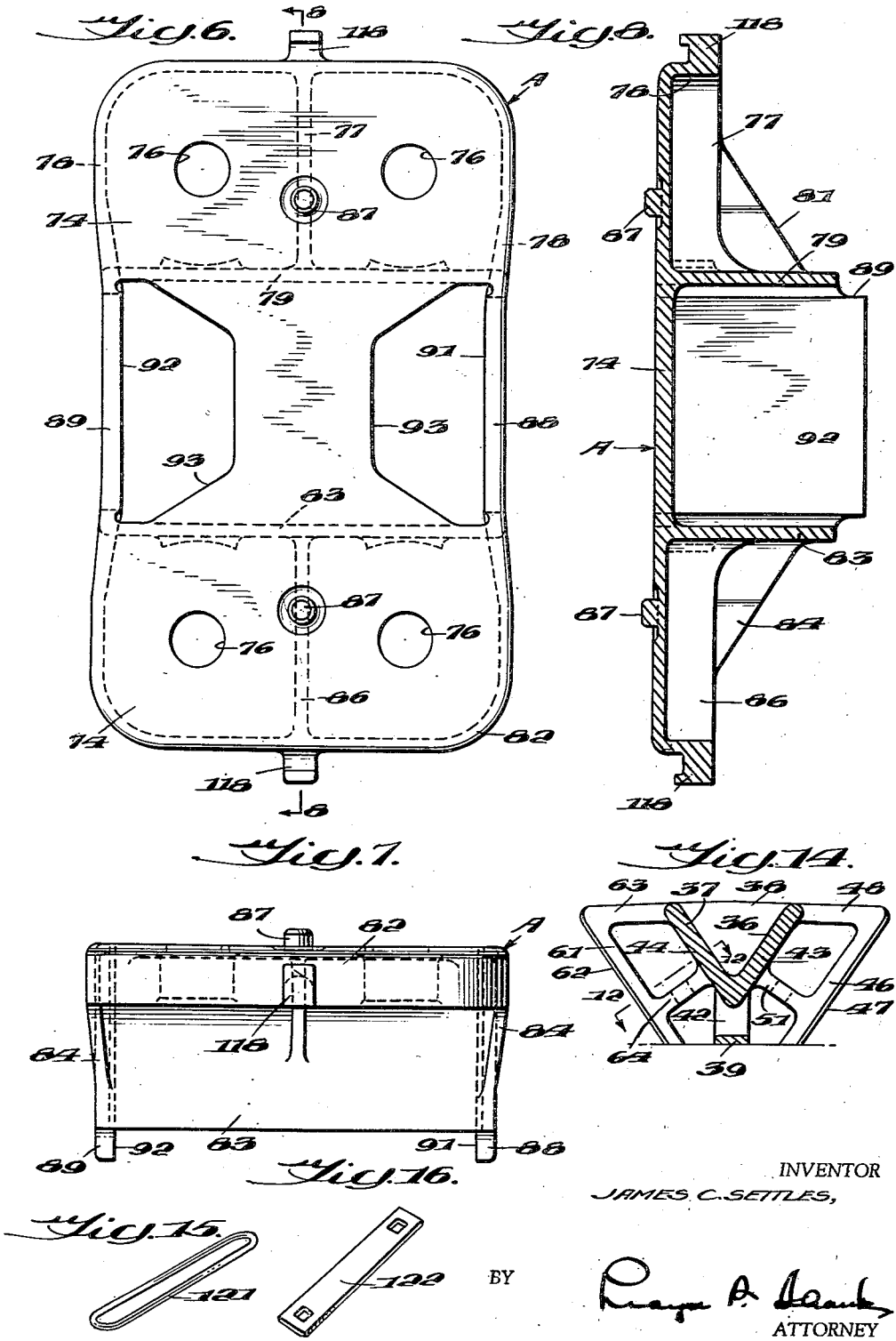

United States Patent Office 2,803,453
Patented Aug. 20, 1957

2,803,453

SPRING GROUP AND DAMPING MECHANISM ASSEMBLY

James C. Settles, Columbus, Ohio, assignor to The Buckeye Steel Castings Company, Columbus, Ohio Application January 31, 1955, Serial No. 485,017

10 Claims. (Cl. 267—9)

The present invention relates to a spring group for railway car trucks combined with a damping mechanism to snub the recoil of the springs which support the load carried by the bolster of a railway car truck. The present application pertains to improvements over the package unit of my copending application Serial No. 414,078, filed March 4, 1954, and is related to the spring group and snubber of my copending application Serial No. 463,156, filed October 19, 1954.

An object of the invention is to provide staggered friction bearing surfaces on the wedges and one of the members of the unit to improve the action of the friction shoes in damping recoil of the load supporting springs with the staggered surfaces so arranged and disposed to provide for maximum facial engagement of the friction shoes with the friction surfaces of the members of the unit thereby providing large wearing surfaces on the parts to improve the snubbing action and promote long and stable operation of the damping mechanism.

Another object of the invention is to provide means in the damping mechanism of such a package unit to promote self-centering of the friction shoes or wedges and thereby avoid a tendency of the friction shoes to shift laterally during compression and release of the wedge actuating springs as the device serves to damp recoil of the load supporting springs.

Other objects and features of the invention will be appreciated and become apparent to those skilled in the art as the present disclosure proceeds and upon consideration of the following detailed description taken with the accompanying drawings wherein an exemplary embodiment of the invention is disclosed.

In the drawings:

Fig. 1 is a plan view of a unit embodying the invention with the right portion of the top member broken away and some of the parts of the damping mechanism omitted to illustrate the relationship of the top and bottom members.

Fig. 2 is a sectional view of the damping mechanism taken on the line 2—2 of Fig. 1.

Fig. 3 is a plan view of the bottom member.

Fig. 4 is an end view of the bottom member.

Fig. 5 is a side elevational view of the bottom member.

Fig. 6 is a plan view of the top member.

Fig. 7 is an end elevational view of the top member.

Fig. 8 is a sectional view of the top member taken on the line 8—8 of Fig. 6.

Fig. 9 is a side elevational view of one of the friction shoes.

Fig. 10 is an inverted plan view of the friction shoe shown in Fig. 9.

Fig. 11 is an elevational view of the flat frictional face of the friction shoe.

Fig. 12 is a sectional view showing a detail of the bottom member taken on the line 12—12 of Fig. 14.

Fig. 13 is a sectional view of a portion of a friction shoe taken on the line 13—13 of Fig. 9.

Fig. 14 is a fragmentary sectional view of the bottom member taken on the line 14—14 of Fig. 3.

Fig. 15 is a perspective view on a reduced scale of one loop of a pair for holding the unit in assembled relationship and Fig. 16 is a similar view of an apertured strap which may be substituted for the loops.

A spring group and damping mechanism exhibiting the invention includes a top member A and a bottom member B with load supporting springs interposed between these members. One coil spring 21 is arranged at each corner of the assembly as shown in Fig. 1 and a further coil spring 22 may be positioned within some or all of the helical springs 21 to vary the load capacity of the unit. A friction damping mechanism for the spring group includes two friction shoes S which are mounted intermediate the load supporting springs. The shoes S are urged by springs 23 into frictional engagement with surfaces carried by the top member A and the bottom member B to damp oscillations of the load supporting springs.

The bottom member B has principally a flat under surface 24 for engaging the spring seat of a railway car truck or a spring plank for the truck. The bottom member carries depending lugs 26 which are adapted to enter spaced holes in the spring seat of the side frame of the truck or similarly spaced holes in the spring plank. The load supporting springs engage an upper surface of the bottom member B and openings 27 are provided at the axis of the helical springs through which water or cinders or the like may escape.

An upstanding flange structure 28 is arranged along the perimeter of one end of the plate portion. An upwardly projecting rib 29 extends inwardly from the flange structure 28 at one end of the bottom member. Two arcuate ribs 31 merge with the rib 29 and are connected to inner portions of the flange structure 28 as shown in Fig. 3. The flange structure 28 and the ribs 29 and 31 serve the purpose of maintaining the lower ends of the load supporting springs in proper positions and reinforce the bottom member. An upstanding flange structure 32 is provided around the perimeter of the other end of the bottom member B. A vertically projecting rib 33 and arcuate ribs 34 connect opposite portions of the flange structure 32. The flange structure 32 and the ribs 33 and 34 maintain the lower ends of the load supporting springs in position on the bottom member and serve to strengthen this member of the unit.

The intermediate portion of the bottom member is of less width than the end extremities which accommodate lower ends of the load supporting springs. The intermediate portion of the bottom member carries parts of the damping mechanism which includes a V-shaped web structure formed of two angularly related plates 36 and 37. These plates extend throughout the length of the intermediate portion and are joined by a centrally located transversely extending triangular shaped web 38. It will be observed from a consideration of Figs. 2 and 14 that the plates 36 and 37 diverge from each other in proceeding upwardly and the faces 43 and 44 are slightly crowned.

A rib 39 projects upwardly from the intermediate portion of the bottom member B and terminates in its central portion at 41 (Fig. 5) below the inverted apex portion of the V-shaped plate structure. A pair of arms 42 extend upwardly from ends of the rib 39 and merge with the ends of the V-shaped plate structure. The outer sloping face 43 of the plate 36 forms one friction face for engagement by an inclined central portion of one friction shoe as hereinafter described and the outer inclined face 44 of the plate 37 presents another centrally disposed friction face for engagement by the central portion of the other friction shoe.

An auxiliary inclined plate 46 (Fig. 14) is provided at one end of the inclined plate 36 and has an outer and under surface 47 which is substantially parallel to the friction face 43 but spaced outwardly therefrom. The upper end of the auxiliary plate 46 is connected to the upper end of the plate 36 by means of a bar 48. A tie member 51 connects the lower end portion of the plate 36 with the auxiliary plate 46. The auxiliary plate 46 continues downwardly and merges with the bottom member B in the vicinity of the rib 39. A similar auxiliary plate 52 (Fig. 4) is provided at the opposite end of the plate 36 and has an outer face 53 which is substantially parallel to but spaced outwardly of the friction face 43. A bar 54 connects the upper end of the auxiliary plate 52 with the top portion of the plate 36. A tie member 56 connects the lower end portion of the inclined plate 36 with the auxiliary plate 52. The auxiliary plate 52 extends below the tie member 56 and joins the bottom plate near the rib 39.

The spring 23 for actuating the friction shoe S is accommodated between the inner edges of the auxiliary plates 46 and 52 and the lower end is adapted to engage a spring seat 57 (Fig. 3) which is provided on the upper face of an inclined portion 58 of the bottom member. The upper face of the spring seat 57 is substantially at right angles to the bisector of the angle formed by the vertical and the inclined friction face 43 and the faces 47 and 53 of the auxiliary plates. The wedge actuating spring 23 is accommodated between the inner edges of the auxiliary plates 46 and 52 and the lower end of the spring is maintained in position on the spring seat by means of arcuate lugs 59 projecting upwardly from the spring seat 57. These lugs are so positioned that one spring 23 or a nest of springs may be employed to actuate the friction shoe.

The opposite side of the intermediate portion of the bottom member is provided with an auxiliary plate 61 (Fig. 14) which has an outer face 62 parallel to but spaced outwardly from the friction face 44 of the inclined plate 37. The upper end of the auxiliary plate 61 is connected by means of a horizontal bar 63 to the upper end of the plate 37. The lower portion of the inclined web 37 is connected to the auxiliary plate 61 by means of a tie member 64. The auxiliary plate 61 extends below the tie member 64 and connects to the bottom member in the vicinity of the rib 39. A fourth auxiliary plate 67 (Fig. 4) is arranged at the other end of the inclined plate 37 and is provided with an outer inclined face 68 which is parallel to but spaced outwardly from the inclined face 44. The auxiliary plate 67 is connected to the upper end of the plate 37 by means of a bar 69. A tie member 71 connects the auxiliary plate 67 to the lower portion of the inclined plate 37. An inclined portion 66 of the bottom member provides a spring seat 72 (Fig. 3) for engagement by the lower end of another spring 23. Arcuate lugs 73 are provided for maintaining the lower end of one or a nest of springs in position on the spring seat 72.

The top member A is generally of rectangular shape and includes a plate portion 74 having holes 76 therein in alignment with the openings 27 in the bottom member B. The four areas of the top member under the plate portion 74 and around the holes 76 provide spring seats which are engaged by the upper ends of the load supporting springs. A depending rib 77 serves to reinforce one end portion of the top member. A flange 78 depends from the perimeter of this end portion. A vertically disposed wall 79 extends downwardly from the plate portion of the top member and the rib 77 connects an outer portion of the depending flange 78 with the wall 79. The portions of the depending flange 78 adjacent the wall 79 extend downwardly as indicated at 81 in Fig. 8.

The other end of the top member A is provided with a depending flange structure 82 which is arranged along the perimeter of the plate. A wall 83 extends downwardly from the top member as shown in Figs. 7 and 8. The depending flange 82 in the two areas adjacent the wall 83 extends downwardly as shown at 84. A depending rib 86 connects the wall 83 with the outer end of the flange structure 82.

A pair of lugs 87 project upwardly from the upper face of the top member and are adapted to enter holes in the bolster of a railway car truck. The top member carries depending walls 88 and 89 which present vertically disposed friction faces 91 and 92. The walls 88 and 89 are parallel and extend between the walls 79 and 83. The top plate in two areas adjacent the walls 88 and 89 is provided with relatively large openings 93.

One of a pair of friction shoes for each unit is shown in Figs. 9 to 11. The friction shoes are of identical construction and each shoe includes a plate 94 which has a flat friction face 96 which is adapted to engage either friction surface 91 or 92 of the top member as shown in Fig. 2. A centrally disposed inclined plate 97 is carried by the friction shoe which presents a flat friction face 98 which diverges from the friction face 96 in proceeding downwardly from the upper end of the wedge. The friction face 98 is adapted to engage either the inclined friction face 43 or 44 of the V-shaped plate structure comprising the plates 36 and 37. The upper end of the central plate 97 is connected to the upper end portion of the plate 94 by means of a web 101. Two upstanding ribs 102 serve to reinforce the web 101. An inclined auxiliary plate 103 is carried by the friction shoe at one side of the inclined central plate 97. This inclined plate 103 presents a friction surface 104 which is parallel to the friction surface 98. The friction surface 104 is adapted to engage one of the auxiliary inclined plates carried by the bottom member B. Another inclined plate 106 is carried by the friction shoe at the other end of the inclined central plate 97. Its friction face 105 is parallel to the friction face 98 and is adapted to engage another of the inclined auxiliary plates on the bottom member. The lower ends of the auxiliary plates 103 and 106 are connected to the vertical plate 94 by means of tie members 107 and 108. The lower ends of the auxiliary plates 103 and 106 are conected to the lower end of the central plate 97 by means of tie members 111 and 112. The web 101 provides a spring seat on the under surface thereof for engagement by the upper end of a wedge actuating spring 23. A hole 114 is provided in the web 101 in alignment with the axis of the spring 23 and openings 116 are provided in the inclined portions 58 and 66 of the bottom member. A bolt (not shown) may be inserted through the openings 114 and through the axis of the springs and through the openings 116 for holding the wedge actuating springs 23 in a compressed condition to facilitate assembly of the unit. The openings 93 in the top member make it possible to remove the bolts.

The top member A is provided with lugs 118 at the ends thereof and the bottom member carreis lugs 119. These lugs are adapted to receive wire loop 121 or a strap 122 having apertures therein to hold the unit in assembled relationship. After shipment and mounting of the unit in a railway car truck the loops or straps are removed.

In assembling the device two springs 23 are placed in position with their lower ends on the spring seats 57 and 72. A friction shoe S is arranged over the upper end of each spring so that the upper end of the spring engage the spring seat provided on the under face of the web 101. A bolt or the like may then be inserted through the openings 114 and through the open axes of the springs 23 and through the openings 116. The springs 23 may thus be compressed to move the friction shoes downwardly so that the inclined friction face 98 of each friction shoe slides along the friction faces 43 and 44 of the V-shaped plate structure and the friction faces on the auxiliary plates 103 and 106 slide downwardly along the friction faces on the inclined auxiliary plates of the bottom member B.

The load supporting springs may then be arranged in position with their lower ends engaging the bottom member B on the four corner areas of the bottom member. The top member A is then positioned over the upper ends of the load supporting springs which engage four under areas of the plate portion 74. A load or a suitable force may then be applied to the top member to move it downwardly relative to the bottom member. A loop such as shown in Fig. 15 or an apertured strap as shown in Fig. 16 may then be applied over the lugs 118 and 119 to maintain the load supporting springs in a compressed condition. The bolts employed to hold the wedge actuating spring 23 compressed and the friction shoes in lowered positions may then be removed through the openings 93. The central plate 97 of each friction shoe is then moved into engagement with the friction faces 43 and 44 of the V-shaped plate structure and the auxiliary inclined plate of each friction shoe is then in engagement with the auxiliary plates carried by the bottom member at the ends of the V-shaped plate structure.

After the assembled unit is in position in a railway car truck and the load of the bolster applied to the top member A the straps 122 or loops 121 may be removed from the lugs 118 and 119 so that the unit is then operable to snub recoil of the load supporting springs. The vertical friction face 96 of each wedge engages the friction faces 91 and 92 of the vertical walls 88 and 89 of the top member A. The central plate 97 of each friction shoe engages the associated plate 36 or 37 and each auxiliary plate of each friction shoe engages its auxiliary plate on the bottom member.

The auxiliary plates 103 and 106 of each friction shoe taper as shown in Fig. 13 and the surface of each auxiliary plates at the ends of the V-shaped plate structure taper as shown in Fig. 12. These tapered surfaces serve to maintain the friction shoes S in centered positions so that there is no tendency of each friction shoe to move laterally during operation of the device.

While the invention has been described with reference to a top member and bottom member and with respect to specific structural characteristics it will be appreciated that the device may be inverted so that the top member engages the spring seat of a side frame of a railway car truck or a spring plank and that the normal bottom member would then engage the under surface of the bolster. The unit may be so inverted without altering the operation thereof. Other changes including details of the structure as well as the general organization may be made and such modifications and others may be carried out without departing from the spirit and scope of the invention as set forth in the appended claims.

What I claim and desire to secure by Letters Patent is:

1. A combined spring group and damping mechanism comprising, a first member, a second member, load supporting springs between the first and second members, a wall carried by the first member having an inwardly facing vertical friction surface, a plate carried by the second member having a friction face thereon converging towards said friction surface, an auxiliary plate at each end of said plate each having a friction face thereon converging towards said friction surface, the friction faces of said auxiliary plates being positioned in a plane spaced horizontally from the face of said plate, a shoe having a vertical friction surface, said shoe having a central sloping friction face thereon engaging the friction face of said plate, a sloping auxiliary plate on the friction shoe at each end of said central sloping face engaging the respective friction faces on said auxiliary plates, a spring compressed between the first member and said shoe, a second wall carried by the first member having an inwardly facing vertical surface, and abutment means acting against the vertical surface of the second wall preventing lateral shifting of the first member with reference to the second member in response to action of said shoe.

2. A spring group and damping mechanism in accordance with claim 1 wherein the friction faces on the auxiliary plates are positioned closer to said first wall than the friction face on the plate.

3. A spring group and damping mechanism comprising, a first member, a second member, vertically disposed helical load supporting springs between the first and second members, a wall carried by the first member having an inwardly facing vertical friction surface, a plate carried by the second member having a friction face thereon converging towards said vertical friction surface, an auxiliary plate at each end of said plate each having a friction face thereon converging towards said vertical surface and substantially parallel to the face on said plate, the friction faces of said auxiliary plates being positioned between said vertical wall and the friction face on said plate, a wedge having a generally vertical friction face lying along and engaging said vertical surface, said wedge having a central sloping friction face thereon engaging the friction face of said plate, an auxiliary plate on the wedge at each end of the central face engaging the friction faces on the first auxiliary plates, a spring positioned between inner edges of the first auxiliary plates compressed between the first member and said wedge, a second wall carried by the first member having an inwardly facing vertical surface, and a second spring actuated wedge acting against the vertical surface on the second wall preventing lateral shifting of the first member relative to the second member in response to the action of the first wedge.

4. In a combined spring group and damping mechanism, a top member, a bottom member, load supporting springs between the top and bottom members, a wall carried by the top member at the intermediate portion thereof having an inwardly facing vertical friction surface, a plate carried by the bottom member having a sloping friction face converging towards said vertical surface in proceeding upwardly, an auxiliary plate at each end of said sloping face each having a sloping friction surface parallel to said sloping face and positioned nearer said vertical surface than the sloping face on said plate, a wedge having a vertical friction face lying along and engaging said vertical surface, a central surface on said wedge engaging said sloping face, an auxiliary inclined plate at each end of said central surface each having an inclined surface engaging the corresponding sloping surface on the first auxiliary plates, a spring compressed between the bottom member and the upper end of said wedge, a second wall carried by the top member at the intermediate portion thereof having an inwardly facing second vertical friction surface, a second plate carried by the bottom member having a second sloping friction face converging towards said second vertical surface in proceeding upwardly, second auxiliary plates one at each end of said second sloping face each having a sloping friction surface parallel to the second sloping face and positioned nearer said second vertical surface than the second sloping face, a second wedge having a vertical friction face lying along and engaging said second vertical surface, a second central surface on said second wedge engaging the second sloping face, an auxiliary inclined plate at each end of the second central surface each having an inclined surface engaging the corresponding sloping surface on the second auxiliary plates, and a spring compressed between the bottom member and the upper end of the second wedge.

5. A bottom member for a combined spring group and damping device comprising, plates forming end portions of said bottom member and an intermediate portion joining said end portions, a V-shaped structure positioned above said intermediate portion, a rib extending upwardly from the intermediate portion having arms connected to end portions of said V-shaped structure, said V-shaped structure having diverging outer surfaces in proceeding upwardly, an auxiliary plate adjacent each end of one of said outer surfaces with each auxiliary plate having a surface generally parallel to the associated outer surface, means tying said auxiliary plates to the V-shaped structure, an auxiliary plate adjacent each end of the other outer surface each having a surface generally parallel to the associated outer surface, and means tying the second auxiliary plates to the V-shaped structure.

6. A bottom member according to claim 5 wherein open areas are provided between the respective tying means.

7. A bottom member for a combined damping device and spring group comprising, plates forming end portions of said bottom member and an intermediate portion joining said end portions, a horizontally arranged V-shaped plate structure positioned above said intermediate portion, a rib connected to the intermediate portion having arms connected to end portions of said V-shaped plate structure, a triangular shaped web joining the plates of said V-shaped structure, said V-shaped plate structure having diverging friction outer and under surfaces, an auxiliary plate at each end of one of said surfaces each having an under surface generally parallel to the under surface of the associated plate, vertically spaced tie members connecting said auxiliary plates to one plate of the V-shaped structure, an auxiliary plate at each end of the other surface each having an under surface generally parallel to the under surface of the associated plate, and vertically spaced tie members connecting the second auxiliary plates to the V-shaped structure.

8. A friction shoe for a combined spring group and damping mechanism comprising, a substantially vertical plate, a centrally disposed plate diverging from said vertical plate in proceeding downwardly at an acute angle with respect to the first plate, an auxiliary plate at each end of said central plate merging with an upper end of said vertical plate, a substantially horizontal web joining a top portion of the central plate with the top portion of the vertical plate, tie members connecting lower ends of said auxiliary plates with a lower portion of said vertical plate, tie members connecting a lower portion of the central plate with lower ends of the respective auxiliary plates, and a spring seat on an under surface of said web in a plane substantially at right angles to a bisector of an angle between the central plate and the vertical plate.

9. A member for a combined spring group and damping device comprising, plates forming end portions of said member, an intermediate portion joining said end portions, a structure positioned above said intermediate portion, means extending upwardly from the intermediate portion connected to end portions of said structure, said structure having diverging outer surfaces in proceeding upwardly, an auxiliary plate adjacent each end of one of said outer surfaces with each auxiliary plate having a surface generally parallel to the associated outer surface, means connecting said auxiliary plates to said structure, an auxiliary plate adjacent each end of the other outer surface each having a surface generally parallel to the associated outer surface, and means connecting the second auxiliary plates to said structure.

10. A friction shoe for a damping mechanism comprising, a substantially vertical plate, a centrally disposed plate diverging from said vertical plate in proceeding downwardly at an acute angle with respect to the first plate, an auxiliary plate at each end of said central plate merging with an upper end of said vertical plate, an inclined web joining a top portion of the central plate with the top portion of the vertical plate, means connecting edges of said auxiliary plates with edge portions of said vertical plate, means connecting edge portions of the central plate with the respective auxiliary plates, and a spring seat on an under surface of said web in a plane substantially at right angles to a bisector of an angle between the central plate and the vertical plate.

References Cited in the file of this patent
UNITED STATES PATENTS

| | | |
|---|---|---|
| 2,116,189 | Clark | May 3, 1938 |
| 2,458,210 | Schlegel | Jan. 4, 1949 |
| 2,483,181 | Clasen | Sept. 27, 1949 |
| 2,483,360 | Cottrell | Sept. 27, 1949 |
| 2,652,002 | Clasen | Sept. 15, 1953 |